United States Patent [19]

Denzer et al.

[11] 3,918,735

[45] Nov. 11, 1975

[54] COLLAPSIBLE GOLF CART

[75] Inventors: Alan R. Denzer, Greenwich, Conn.; Edward F. Powers, Jr., Westfield, N.J.

[73] Assignee: Zamax Manufacturing Co., Inc., Belleville, N.J.

[22] Filed: Nov. 18, 1974

[21] Appl. No.: 524,791

[52] U.S. Cl. .......................... 280/36 C; 280/DIG. 6
[51] Int. Cl.² .......................................... B62B 1/16
[58] Field of Search .......... 280/36 C, 41 C, DIG. 6, 280/47.26

[56] References Cited
UNITED STATES PATENTS

| | | | |
|---|---|---|---|
| 2,574,232 | 11/1951 | Welsh | 280/42 |
| 2,575,930 | 11/1951 | Schwartz | 280/47.26 |
| 3,726,537 | 4/1973 | McLoughlin | 280/DIG. 6 |
| D186,428 | 10/1959 | Gunning | 280/DIG. 6 |

FOREIGN PATENTS OR APPLICATIONS

| | | | |
|---|---|---|---|
| 722,429 | 1/1955 | United Kingdom | DIG. 6 |

*Primary Examiner*—Robert R. Song

[57] ABSTRACT

A collapsible golf cart comprising a center member, two wheel legs, a handle member and a bag holder leg having a pivoted golf bag retainer base plate, said center member and said legs being removable from said center member and tethered to said center member by elastic cords so that said member and legs may be folded together into a compact bundle, the wheels being removable.

12 Claims, 16 Drawing Figures

COLLAPSIBLE GOLF CART

This invention relates to a golf cart which may be collapsed to form a compact portable bundle.

Briefly, it is an object of the invention to provide a golf cart having almost all of its parts separable but tethered together by flexible elastic cords so that such parts may be folded together into a compact bundle which can be easily carried and takes up comparatively little space.

It is well-known that golf carts presently in use take up a lot of space so that such carts are not easily carried. It is, therefore, an object of this invention to provide a golf cart which is comparatively light in weight and takes up a minimum of space.

It is also well-known that golf fees for caddies have gone up considerably so that many people who would like to play golf cannot afford the price of a golf caddie and, therefore, either play less frequently, or give up the game entirely. By use of the golf cart of this invention, a player can easily carry the collapsed golf cart to the golf course and set it up in a matter of minutes, thus eliminating the necessity of a caddy and permits the player to carry his or her own clubs safely and easily around the golf course with a minimum of effort.

A foursome can easily carry four of the callapsible golf carts of this invention in the trunk of one automobile and save a considerable sum of money weekly by each player easily rolling his or her own golf clubs around the golf course in the cart of this invention.

Because of the tubular construction of this golf cart, the cart is comparatively light in weight, rapidly set up, relatively inexpensive and easy to use without employing a golf caddy.

Other features and many of the attendant advantages of the invention are described and rendered obvious by the following detailed description in association with the accompanying drawings wherein.

Figure 1:
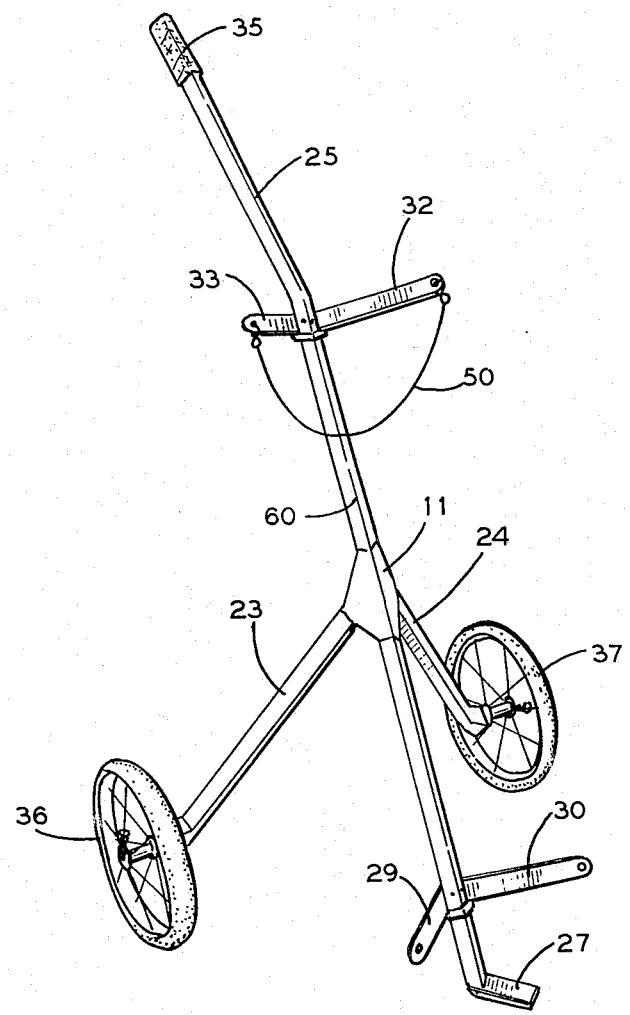
FIG. 1 is a perspective view of the golf cart in its assembled condition.
Figure 6:
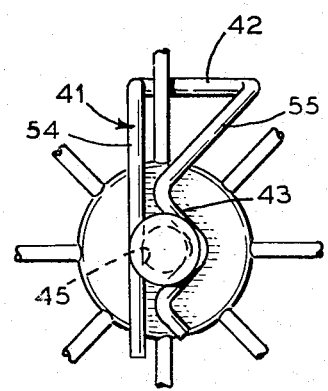
FIG. 6 is a front view of the retainer clip seated on the axle of the wheel.
Figure 7:
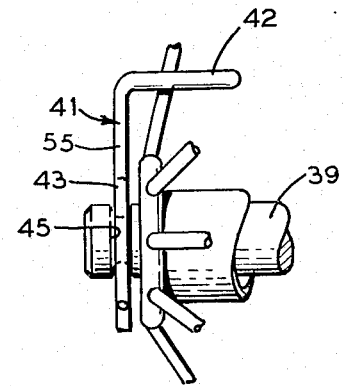
FIG. 7 is a side view of the retainer clip shown in FIG. 6.
Figure 2:
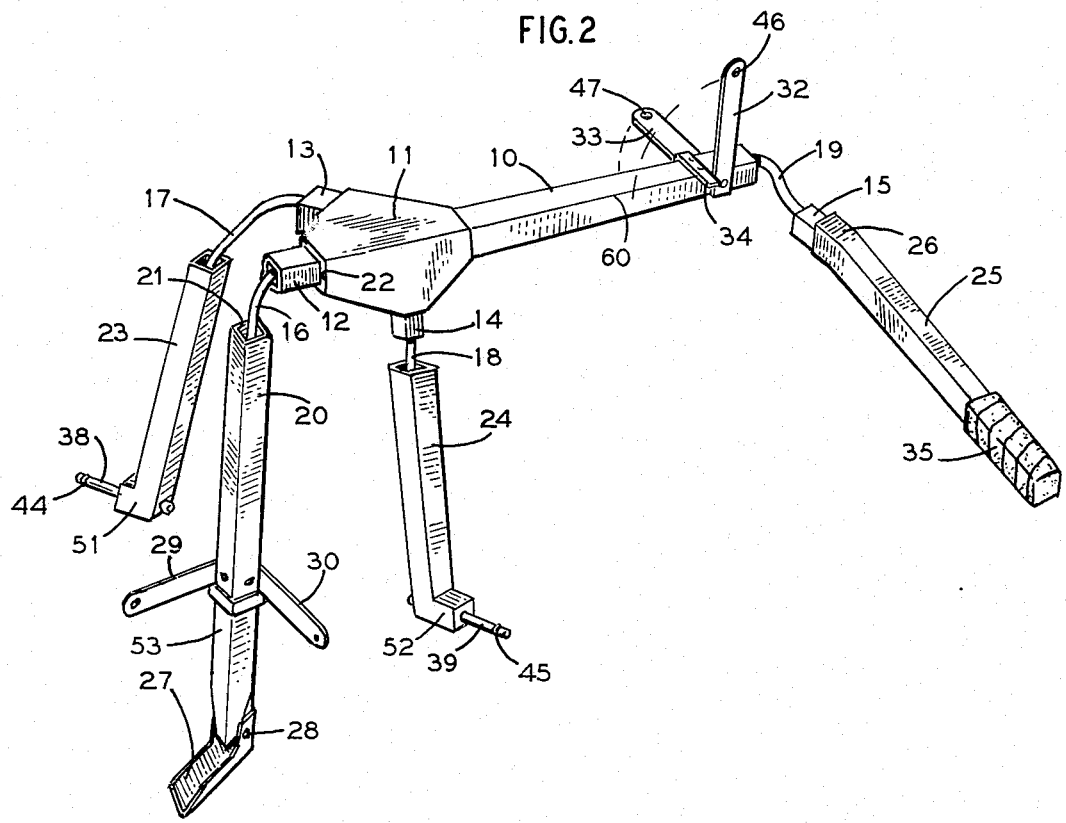
FIG. 2 is an exploded view thereof.

Referring to the drawings, numeral 10 represents a center tubular member which may be any type of tubing but preferably of square tubing. The tubing may be of metal or plastic. Since the square tubing is preferred, this description will be directed to the square tubing. At one end of the center member 10, which is called the lower end, is a hub 11 which has three reduced square tubular extensions 12, 13 and 14. Hub 11 is permanently attached to center member 10 by any known means. The said extensions 12, 13 and 14 are of a size and length to snugly fit within the ends of square tubing of three legs preferably of the same dimensions as the square tubing of the center member 10; one leg 20 being a golf bag retainer leg, and legs 23, 24 being right and left wheel legs, respectively. Extension 12 is in alignment with the center tubular member 10 and hub 11 to receive and retain the golf bag retainer leg in alignment with the hub 11 and center member 10. Extensions 13, 14 are angularly and downwardly disposed to hub 11 to receive and retain the wheel legs 23, 24 in a downward angular position so that when the wheels 36, 37 are on the wheel legs and the bag retainer leg is positioned on extension 12, the golf cart will stand of its own accord in an upright angular position, as shown in FIG. 1. When bag retainer leg 20 is aligned with hub 11 and center member 10, its inner end 21 abuts shoulder 22 of hub 11. Wheel legs 23, 24 also have their inner ends abut a similar shoulder of hub 11 when such legs are placed on the extensions 13, 14.

Wheel legs 23, 24 have lower outwardly extending portions 51, 52, respectively, substantially at right angles to said wheel legs. Each of said extending portions 51, 52 has an outwardly extending axle 38, 39 for receiving a wheel 36, 37. Axle 38, 39 may be positioned in extending portions 51, 52 in a hole drilled centrally and longitudinally through portions 51, 52 and may be slidable therein so as to be retractable and thus take up less space when the cart is collapsed, or the axles may be a unitary part of the extending portions 51, 52. Stop means may be used, such as a cotter pin at the inner end of the axle to prevent the axle from leaving the hole within the extending portion 51, 52. Adjacent the outer end of each axle 38, 39 there is a circumferential semi-circular groove 44, 45, the purpose of which will be hereinafter described.

Bag retainer leg 20 has a tapered lower end 53 to which is pivotally attached an outwardly extending golf bag retainer base plate 27 by pivot pin 28 which stops in its outward position substantially at right angles to said leg 20 and pivots upward so that it is flush with the square sides of leg 20 when the cart is collapsed. Adjacent the lower end of leg 20 are two like pivoted bag retainer arms 29, 30 attached to two adjacent faces of square tubing of leg 20, as shown, so that said arms may pivot outwardly and stop at substantially right angles to said leg 20 against stop member 31 forming substantially a 90° V-shaped extension to aid in holding a golf bag in position on the golf cart when the golf bag is placed upon retainer plate 27.

Center member 10 also has a similar pair of pivoted bag retainer arms 32, 33 at its upper end attached to similar adjacent faces of the square tubing of member 20 so that said arms may pivot outwardly to stop at substantially right angles to said member 20 against stop member 34 forming substantially a 90° V-shaped extension to aid in holding the golf bag in position on the golf cart. Adjacent the outer end of each arm 32, 33 there is an opening 46, 47, the purpose of which will be hereinafter described.

A handle member 25, also preferably made of the same square tubing as the other members, has a reduced square tubular extension 15 which is of a length and size to snugly fit within the upper end of the square tubing of center member 10. Adjacent extension 15 the handle member is bent at an obtuse angle as shown at 26, so that it is angularly disposed to the center member 10 when it is positioned together with the center member 10. The angle of the handle makes it easier for the player to grasp the handle when the golf cart is at rest on the ground and when the cart is in use for pulling the golf bag and golf clubs. The outer or extreme end of handle member 25 preferably has a rubber or plastic finger grip or handle 35 for greater convenience and comfort in pulling the golf cart.

Flexible elastic cords 16, 17, 18 and 19 are secured within hub 11 and within the legs 20, 23, 24 and in handle member 25. The ends of the elastic cords may be secured or attached to hub 11, center member 10 and legs 20, 23, 24 and handle 25 in several ways, such as by a loop or opening in the interior of the casting of the hub and center member 10 and in the legs and handle; by pins passing through loops at the ends of the elastic cords and through the tubes or casting, or by any other wellknown means. The elastic cords are of a length to hold the legs and handle member under tension when in assembled relation with the hub 11 and center member and will permit the legs and handle member to be manually separated from the hub and center member so that such legs and handle member may be folded together against the center member to form a compact bundle. This bundle is easily held together by an elastic cord 50 which has a hook 48, 49 attached to each end thereof. Cord 50 is of a length that will pass around the compact bundle and hooks 48, 49 may be interlocked so that the elastic cord 50 will hold the members of the collapsed golf cart firmly together within the circumscribed band formed by cord 50 around the bundle. When the golf cart is in its assembled position and a golf bag is placed upon retainer base plate 27, hooks 48, 49 of cord 50 are placed in openings 46, 47 of arms 32, 33 and the cord 50 passed around the upper portion of the golf bag (not shown) under tension thus insuring that the golf bag is firmly held upon the cart during use. Thus, cord 50 serves the dual purpose of holding the golf bag upon the cart and encircling the collapsed members of the golf cart when in collapsed condition when it is folded into a bundle. When cord 50 is so used it is not apt to be lost.

It has been found that when the tubings of legs 20, 23, 24 and handle 25 are positioned with their reduced extensions 12, 13, 14 and 15 together with the elastic cords 16-19, the assembled golf cart is exceptionally firm and rigid and can only be pulled apart and collapsed by manually pulling the members apart against the tension of the elastic cords.

The wheels 36, 37 each have a retainer clip 40, 41 which has a main body comprising two resilient legs 54, 55, and an upper end 42. The clip 40, 41 is preferably made of resilient wire of circular cross section. The upper end may be arcuate, as shown, or square and it is bent at substantially a right angle to the main body. Leg 54 may be straight and leg 55 may have a triple bend, as shown at 43 to provide a curved portion between the legs 54, 55 so that the clip 40, 41 will be retained within the groove 44, 45 of axle 38, 39 by the resilient tension of the metal from which the clip is made and the character of the bent upper portion of the clip and the fact that the legs of the clip are practically together. The reason for the right angle bend of the upper part of the clip is that the clip is placed upon a spoke of the wheel 36, 37 so that the clip cannot be lost and remains on the wheel. As the wheel revolves with the clip thereon, the legs 54, 55 of the clip revolve in the semi-circular groove 44, 45 with the turning of the wheel.

Figure 3:
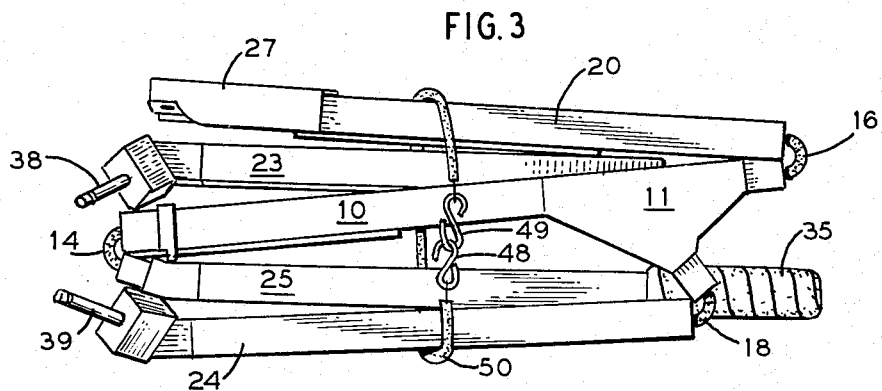
FIG. 3 is the cart in its collapsed form held together as a bundle by an elastic cord, with the wheels removed.
Figure 4:
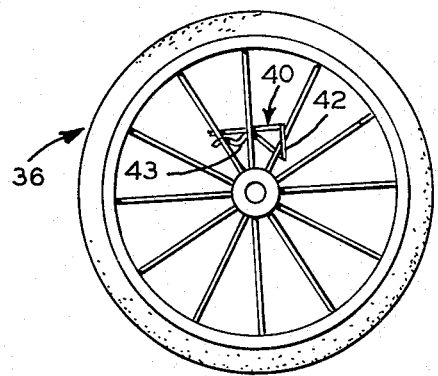
FIGS. 4 and 5 are a plan view of the wheels.
Figure 5:
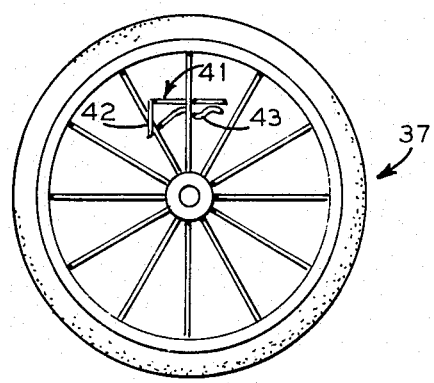
Figure 8:
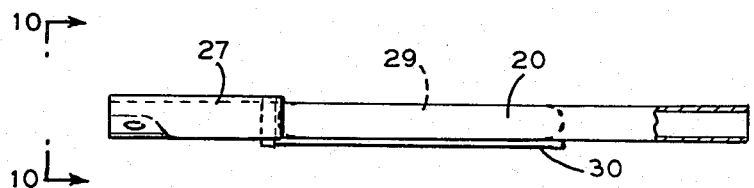
FIG. 8 is a plan view of the golf bag retainer leg.
Figure 9:
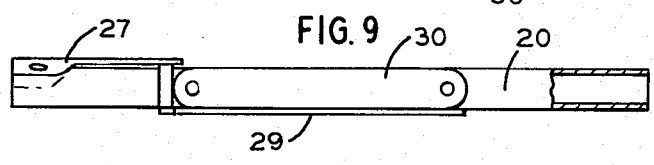
FIG. 9 is a side view of the bag retainer leg shown in FIG. 8.
Figure 10:
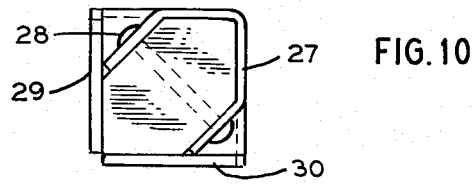
FIG. 10 is a view taken along lines 10—10 of FIG. 8.
Figure 11:
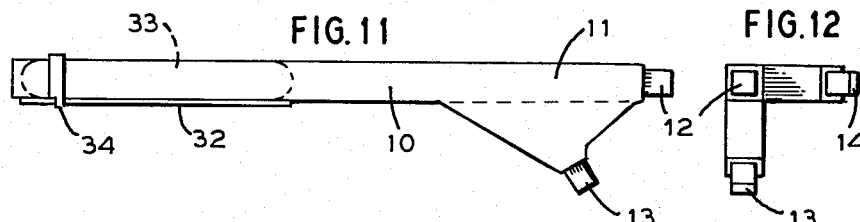
FIG. 11 is a plan view of the center member.
Figure 12:
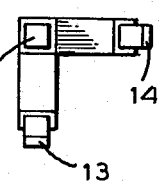
FIG. 12 is the right end view of the center member.
Figure 13:
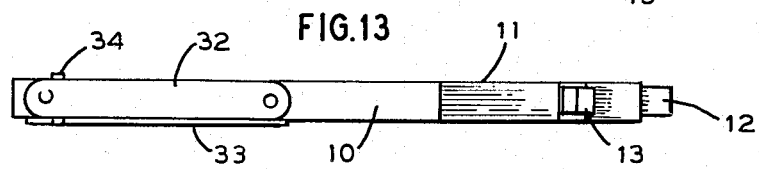
FIG. 13 is a side view of the center member.
Figure 14:
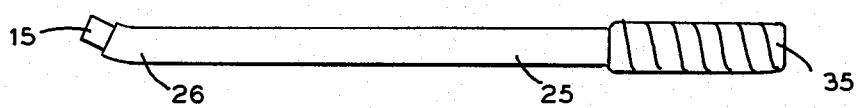
FIG. 14 is a plan view of the handle member.
Figure 15:
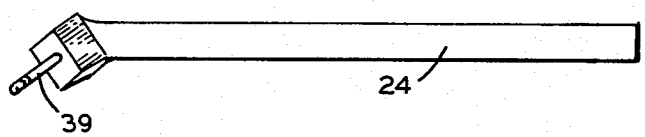
FIG. 15 is a view of a wheel leg.
Figure 16:
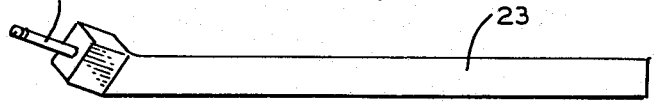
FIG. 16 is a view of the opposite wheel leg.

To assemble the golf cart from its collapsed condition, the hooks 48, 49 of elastic cord 50 are separated and the cord 50 is removed from the bundle as shown in FIG. 3, which is comprised of all the parts of the cart except the wheels 36, 37 with clips 40, 41 around a spoke of each wheel. Holder arms 32, 33 are pivoted outwardly until they meet stop 34. Handle member 25 is aligned with the center member 10, as shown in FIG. 1, and extension 15 is placed within the hollow outer end of center member 10. The flexible elastic cord 19 will retract and aid in holding member 25 in its position on the center member. Since extension 15 fits snugly within the hollow tubular end of center member 10 there is no likelihood of the handle member 25 becoming separated from the center member 10. Wheel legs 23, 24 are similarly positioned on extensions 13, 14 with their extending portions 51, 52 and axles 38, 39 in outward position. The same is done with bag retainer leg 20 which is seated on extension 12 with its pivoted base plate 27 lowered to its outer position, as shown in FIG. 1. Retainer arms 29, 30 are pivoted outwardly until they meet stop 31. Wheels 36, 37 are then placed on their axles 38, 39 and clips 40, 41, each of which is around a spoke of the wheel, are pushed downward within the groove 44, 45 of the axle causing the resilient legs 54, 55 to spread and remain retained under tension upon the end of the axle. Elastic cords 16, 17 and 18 aid in retaining the legs 20, 23, 24 in fixed and firm position on the hub 11. The golf bag (not shown) is then placed upon the bag retainer base plate 27 and between extended arms 29, 30 and 32, 33 and hooks 48, 49 are placed in openings 46, 47 of the upper arms 32, 33 with elastic cord 50 around the upper part of the golf bag thus securely holding the golf bag with its clubs therein firmly in position on the cart.

To disassemble the cart, the wheels 36, 37 with their clips 40, 41 are first moved from their axles 38, 39, legs 20, 23, 24 and handle 25 are manually separated from hub 11 and center member 10 against the tension of the elastic cords 16-19 and placed or folded against the hub and center member forming a bundle which is held together in its collapsed bundle form by elastic cord 50 hooked together by hooks 48, 49, as shown in FIG. 3.

It should be noted that the edge 60 of center member 10 and hub 11 is the leading outer edge of the assembled cart and the handle member 25 and bag retainer leg 20 are properly aligned with the hub and center member so that the base plate 27 and the bent handle portion 26 are in their correct positions, as shown on FIG. 1.

The invention is not limited to the specific construction shown in the drawings and hereinbefore described. It is also contemplated that the legs and member of the cart may be made of solid material with only the ends of the legs and members which are reduced in size adapted to fit within hollow portions of the members upon which such parts are seated. It is also possible to use tubular members with different cross sections to accomplish the same result. Of course, it will be understood that various departures and modifications of the structure shown and described may be made without departing from the spirit of the invention as defined by the appended claims.

What is claimed is:

1. A collapsible golf cart comprising:
a center member,
a tubular bag holder leg,
a right and left tubular wheel leg and a tubular handle member,
a hub at one end of said center member,
flexible elastic cords secured within said hub and within said legs and said handle member,
said hub having extensions cooperating with the tubular ends of said wheel legs and said bag holder leg to hold said wheel legs in outwardly diverging angular relation to and said bag holder leg in alignment with said center member, an axle for each of said wheel legs,
a bag retainer base plate pivotable outwardly from said bag holder leg,
said handle member having an extension at one end adapted to fit snugly within a tubular end of said center member,
a wheel for each of said axles,
said elastic cords of a length to hold said legs and handle member under tension when in assembled relation with said hub and center member to permit said legs and handle member to be separated from said hub and center member and be folded together into a compact bundle.

2. The golf cart according to claim 1 wherein a flexible elastic cord is provided for each of said wheel legs, said bag holder leg and said handle member.

3. The golf cart according to claim 1 wherein said axle at the end of each wheel leg extends outwardly substantially at right angles to said wheel leg.

4. The golf cart according to claim 1 wherein said handle member is bent adjacent its inner end at an obtuse angle to said handle member so that it is angularly disposed to said center member when said handle member and said center member are positioned together.

5. The golf cart according to claim 1 wherein said bag holder leg and said center member each have a pair of lower and upper bag retainer arms respectively adapted to pivot outwardly substantially at right angles to said bag holder leg and said center member for aiding in the support of a golf bag positioned upon said cart.

6. The golf cart according to claim 5 wherein said bag retainer leg and said center member has means for holding said retainer arms substantially at right angles to said bag retainer leg and said center member.

7. The golf cart according to claim 6 wherein the outer end of each of said upper bag retainer arm has an opening to receive a hook at the end of an elastic tying cord that passes around the upper portion of said golf bag when said golf bag is positioned on said cart to hold said golf bag firmly in position on said cart.

8. The golf cart according to claim 7 wherein said elastic tying cord is of a length that has the dual purpose of holding said golf bag firmly in position on said cart and firmly holding the members of said cart together when in collapsed position to insure against loss of said elastic tying cord.

9. The golf cart according to claim 1 wherein each axle has a circumferential groove adjacent its outer end for receiving a wheel retainer clip to prevent the wheel from falling off said axle.

10. The golf cart according to claim 9 wherein each of said retainer clips has an upper end and a lower end, said upper end bent substantially at right angles to said lower end to permit said upper end to engage a spoke of said wheel for storing of said clip on said wheel when said wheel has been removed from said cart when not in use.

11. The golf cart according to claim 1 wherein said tubular members are substantially square.

12. The golf cart according to claim 11 wherein said bag retainer base plate is substantially V-shaped permitting it to lie flush against said square bag holder leg when said base plate is pivoted to its upward position.

* * * * *